United States Patent [19]
Vogt et al.

[11] Patent Number: 5,260,522
[45] Date of Patent: Nov. 9, 1993

[54] DOUBLE-WALL HOLLOW BODY WITH INTERLAYER AND METHOD FOR MANUFACTURING SAME

[75] Inventors: Gerd Vogt, Meerbusch-Strümp; Manfred Janssen, Krefeld; Ulrich Becker, Duisburg, all of Fed. Rep. of Germany

[73] Assignee: Mannesmann Aktiengesellschaft, Dusseldorf, Fed. Rep. of Germany

[21] Appl. No.: 651,197

[22] Filed: Feb. 6, 1991

[30] Foreign Application Priority Data

Feb. 8, 1990 [DE] Fed. Rep. of Germany ....... 4004072

[51] Int. Cl.⁵ ............................................. F16F 15/00
[52] U.S. Cl. .................... 181/207; 181/208; 181/256
[58] Field of Search ............... 181/207, 290, 292, 294, 181/222, 252, 256, 208, 209; 29/590.08, 523; 464/903, 180, 181

[56] References Cited

U.S. PATENT DOCUMENTS

| | | | |
|---|---|---|---|
| 3,415,336 | 12/1968 | Arthur et al. | 181/252 |
| 3,765,506 | 10/1973 | Strunk | 181/252 |
| 4,239,091 | 12/1980 | Negrao | 181/252 |
| 4,272,971 | 6/1981 | Loyd et al. | 464/181 |
| 4,860,851 | 8/1989 | Krevor et al. | 181/208 |

Primary Examiner—Michael L. Gellner
Assistant Examiner—Eddie C. Lee
Attorney, Agent, or Firm—Cohen, Pontani, Lieberman, Pavane

[57] ABSTRACT

A double-wall hollow body comprises an inner hollow body and a cooperating outer hollow body. The outer hollow body is frictionally attached to the inner hollow body, and is radially spaced from the inner body so that an annular space is formed between the two bodies. Acoustic-damping insulating material is contained within the annular space, and forms an interlayer between the inner and outer bodies. An end of the double-wall hollow body is formed by respective ends of the inner and outer hollow bodies that rest directly against each other without insulating material. The inner hollow body is separated over an entire circumference from the outer hollow body by the insulating interlayer. Various methods of manufacturing the foregoing double-wall hollow body are also described. For instance, to apply the insulating material to the inner hollow body, such body may be heated and then rolled into the insulating material.

7 Claims, 1 Drawing Sheet

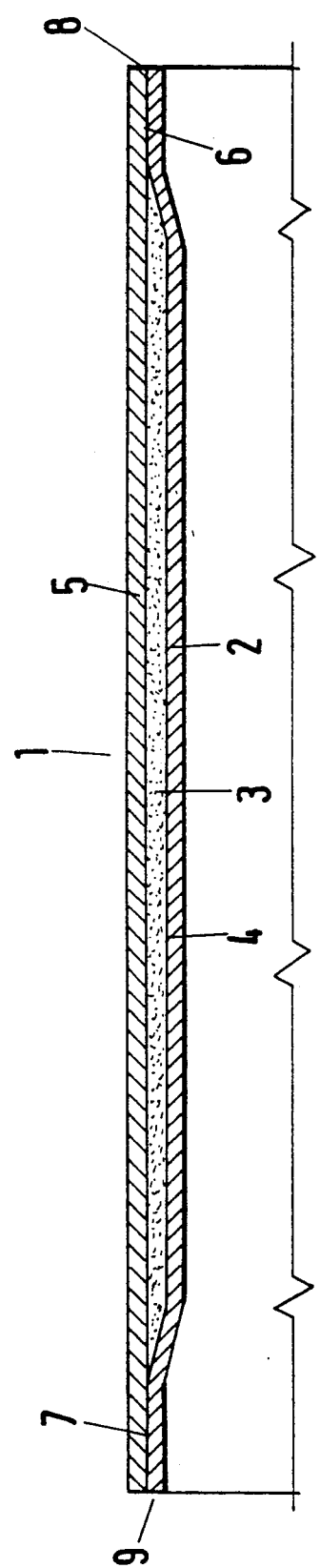

DOUBLE-WALL HOLLOW BODY WITH INTERLAYER AND METHOD FOR MANUFACTURING SAME

BACKGROUND OF THE INVENTION

The present invention relates to a double-wall hollow body including acoustic-damping insulating material between inner and outer hollow bodies.

A double-wall hollow body of the foregoing type is known from Federal Republic of Germany Patent 3,712,193. It consists of an inner pipe and an outer pipe spaced apart in such a manner as to form an annular space. Within such space ceramic powder is arranged to form acoustic insulation. The outer pipe consists of a steel whose resistance to temperature is less than that of the inner pipe. The outer pipe is attached at its constricted ends in a gas-tight manner to the inner pipe. The foregoing double-wall hollow body has the disadvantage that the necessary technique of introducing the ceramic powder impedes the mass production of large numbers of units. The double-wall hollow body is also unsuitable as a structural part for the transmission of forces and torques.

SUMMARY OF THE INVENTION

An object of the invention, therefore, is to provide an improved double-wall hollow body that is suited for mass production as a sound-damping element in the manufacture of automobiles, and that can transmit higher forces and torques.

The foregoing object is achieved by the invention comprising an inner hollow body that is frictionally attached to an outer hollow body to form a double-wall hollow body. An interlayer consisting of non-metallic acoustic-damping material separates the inner hollow body from the outer hollow body over a circumference of the inner hollow body. The cross-sectional profile of the inner and outer hollow bodies can, in principle, be any desired shape; such profile is dependent primarily on the specific purpose of use of such a double-wall hollow body. The cross section is preferably circular, since the production of circular hollow bodies is favorable from a cost standpoint and the manufacture of a circular, double-wall pipe is particularly simple.

The double-wall hollow body of the invention has the advantage that, due to the elimination of a weld seam passing through the interlayer, one has greater freedom in selecting an optimum insulating material; this is because no regard has to be taken of the tolerances of welding. Additionally, due to the frictional attachment, a long continuous section is formed that is not interrupted by metallic bridges; this allows the acoustic damping to be especially effective.

For producing the double-wall hollow body already described, a method of the invention involves (i) first applying the interlayer to the inner hollow body, (ii) introducing the resulting product into the outer hollow body and, finally, (iii) so strongly plastically deforming at least one of the two hollow bodies that it comes to rest with a frictional lock on the other hollow body.

The interlayer can be applied to the inner hollow body in various ways and manners. One possibility is to pull the interlayer in the form of a tube over the inner hollow body. From a cost standpoint, using a flat product for the intermediate layer and wrapping the inner hollow body in an interlayer precut to size are more favorable. Depending on the nature of the insulating material, attachment to the inner hollow body may be effected by heat or by an adhesive.

The widening required after inserting the inner body provided with the interlayer into the outer hollow body of larger inside dimension can be effected either hydraulically or mechanically. For instance, the widening can be effected by pushing therethrough an expanding inner tool; in this connection, an additional widening is necessary in the region of the section that is free of the interlayer. Hydraulic widening is always preferred if more than one section is to be free of the interlayer or if such section is not located at the end of the hollow body.

Another possibility of applying the interlayer consists in winding a tape of insulating material on the hollow body, whether in one or more layers. As an alternative to widening, it is also possible to reduce the circumference of the outer hollow body and allow it to come to rest against the inner hollow body. Such a reduction is possible, for instance, by drawing or rolling. In this method also, the region of the section free of interlayer must be additionally further deformed.

The material for the inner and outer hollow bodies should be readily plastically deformable. The two hollow bodies may consist of the same material for considerations of cost. Depending on the purpose of use, it may, however, be advantageous to select different materials for the hollow bodies which are to be connected to each other. Thus, for instance, with a view to the deformability of the hollow body to be reshaped, different materials might be warranted in view of the required stiffness of the double-wall hollow body produced and the corrosion resistance of the hollow bodies. The interlayer used should be of low cost, be particularly suitable for applying to the inner hollow body, and have a good acoustic insulating value. These conditions are satisfied to a large extent by, for instance, bitumen sheet.

The foregoing method is advantageously used to produce a sound-dampened universal shaft having an interlayer-free section at each end. In this way, the corresponding connecting part can be welded without difficulty on each end, and the moment of rotation transmitted via the pipe attachment. As a result of an increasing prohibition against night-time travel by trucks, importance of reducing the emission of noise has increased. Efforts have focussed on encapsulating the engine as a main source of noise emission. In the case of other aggregates, the universal shaft, among others, is also a part that radiates a broad noise spectrum. The double-wall pipe of the invention is, therefore, particularly suitable for remedying this, without limiting the function of the universal shaft in any way. Furthermore, the double-wall pipe also has the advantage of a saving in weight as compared with previously known forging.

BRIEF DESCRIPTION OF THE DRAWING

The manufacture of a double-wall hollow body in accordance with the invention will be explained in further detail with reference to the drawing.

The sole figure of the drawing shows, in a semi-cross section, an embodiment of the double-wall hollow body of the invention.

DETAILED DESCRIPTION OF THE PREFERRED EMBODIMENT

FIG. 1 shows a embodiment of the double-wall hollow body of the invention in the form of a double-wall pipe 1. It consists of an inner pipe 2, for instance of steel ST37, which is covered with a non-metallic sound-damping interlayer 3. The interlayer 3 in this example consists of a bitumen sheet and has a thickness of, for instance, 1 mm. Before the insertion, the outer surface 4 of the inner pipe 2 is provided with an adhesive, and the inner pipe 2 is then rolled into the interlayer 3 which has been previously cut to size. The outside dimension of the coated inner pipe 2 which then results is, for instance, 1 to 3 mm less than the inside diameter of the outer pipe 5 which has already been produced; this makes easy insertion possible. The dimensions of the pipes should here amount for instance to 50×1 mm for the inner pipe 2 and 55×1 mm for the outer pipe 5. The outer pipe 5 should in this example also be a steel pipe of the same material. The open ends of the double-wall pipe 1 are then closed in known manner and the inner pipe 2 is widened hydraulically. By the widening process a friction lock of the inner pipe 2 to the outer pipe 5 together with the interposed interlayer 3 is obtained.

Upon hydraulic widening, the internal pressure can be so established that only the plastic pipe 2 flows plastically while the outer pipe 5 is not also reshaped. In particularly critical cases and in the case of complicated profile cross sections it is advisable to place the outer pipe 5 in a die so that it either is not simultaneously shaped or is simultaneously shaped only to the extent resulting from the size of the die. This manner of procedure would also have the advantage that the final double-wall pipe 1 has a precisely defined outer diameter and it can thus be equated to a calibration.

The length of the interlayer 3 arranged on the inner pipe 2 is so dimensioned in the example of the universal shaft that a section 6, 7 which is free of interlayer is present at both ends. The corresponding connecting piece (here also not shown) can be welded to the ends 8, 9 of these two sections 6, 7.

It should be understood that the preferred embodiments and examples described are for illustrative purposes only and are not to be construed as limiting the scope of the present invention which is properly delineated only in the appended claims.

What is claimed is:

1. An acoustically dampened double-wall hollow body for the transmission of forces and torques, consisting essentially of:
    an elongated imperforate inner hollow body and a cooperating elongated imperforate outer hollow body, at least one of said hollow bodies being made of a plastically deformable material;
    the outer hollow body being frictionally attached to the inner hollow body at the respective ends thereof and being radially spaced from the inner hollow body for forming a continuous annular space between said inner and outer hollow bodies;
    an acoustic-damping insulating material contained within said annular space and forming an interlayer between the inner and outer hollow bodies; said inner hollow body and outer hollow body being formed of a metal selected for transmitting forces and torques between said respective ends thereof;
    an end of the double-wall hollow body being formed of said respective ends of the inner and outer hollow bodies that rest directly against each other by said frictional attachment and without insulating material therebetween; and
    the inner hollow body being separated over an entire circumference from the outer hollow body by said interlayer.

2. A double-wall hollow body according to claim 1, wherein the interlayer comprises a bitumen sheet.

3. A double-wall hollow body according to claim 1, wherein the acoustic-damping material is non-metallic.

4. A double-wall hollow body according to claim 1, wherein said body comprises an acoustically insulated universal shaft having a section free of insulating material at each end.

5. The double-wall hollow body of claim 1, wherein said inner and outer elongated imperforate bodies are made of steel.

6. The double-wall hollow body of claim 1, wherein said inner and outer elongated imperforate hollow bodies are made of the same material.

7. The double-wall hollow body of claim 1, wherein at least one of said inner and outer elongated imperforate bodies is made from ST 37 steel.

* * * * *